(12) United States Patent
Suzuki

(10) Patent No.: US 10,602,218 B2
(45) Date of Patent: *Mar. 24, 2020

(54) ENCODING DEVICE AND METHOD, DECODING DEVICE AND METHOD, EDITING DEVICE AND METHOD, RECORDING MEDIUM, AND PROGRAM

(71) Applicant: Sony Corporation, Tokyo (JP)

(72) Inventor: Teruhiko Suzuki, Chiba (JP)

(73) Assignee: SONY CORPORATION, Tokyo (JP)

( * ) Notice: Subject to any disclaimer, the term of this patent is extended or adjusted under 35 U.S.C. 154(b) by 11 days.

This patent is subject to a terminal disclaimer.

(21) Appl. No.: 15/250,176

(22) Filed: Aug. 29, 2016

(65) Prior Publication Data

US 2016/0373759 A1 Dec. 22, 2016

Related U.S. Application Data

(60) Continuation of application No. 14/293,553, filed on Jun. 2, 2014, which is a continuation of application
(Continued)

(30) Foreign Application Priority Data

Apr. 26, 2002 (JP) .................................. 2002-125298

(51) Int. Cl.
*H04N 19/152* (2014.01)
*H04N 19/115* (2014.01)
(Continued)

(52) U.S. Cl.
CPC ..... *H04N 21/44004* (2013.01); *H04N 19/115* (2014.11); *H04N 19/15* (2014.11);
(Continued)

(58) Field of Classification Search
None
See application file for complete search history.

(56) References Cited

U.S. PATENT DOCUMENTS 5,365,552 A 11/1994 Astle
5,793,436 A 4/1998 Kim
(Continued)

FOREIGN PATENT DOCUMENTS

EP 0 871 337 A2 10/1998
EP 1 298 938 A2 4/2003
(Continued)

OTHER PUBLICATIONS

Supplementary European Search Report dated Oct. 5, 2010, in Application No. 03747213.1-1427 / 1501309 PCT/JP0304598.
(Continued)

*Primary Examiner* — Frederick D Bailey
(74) *Attorney, Agent, or Firm* — Xsensus LLP

(57) ABSTRACT

The present invention relates to an encoding device and a method, a decoding device and a method, an editing device and a method, a storage medium, and a program which can perform encoding and decoding so that buffer failure does not occur. Information, such as a minimum bit rate, a minimum buffer size, and a minimum initial delay time, is contained in a random access point header contained in an accessible point in a bitstream. A bitstream analyzing unit 72 analyzes an input bitstream, sets the above-mentioned information, and outputs the resulting information to a buffer-information adding unit 73. The buffer-information adding unit 73 adds the input information to the input bitstream and outputs the resulting bitstream. The present invention is applicable to an encoding device and a decoding device which process bitstreams.

11 Claims, 10 Drawing Sheets

Related U.S. Application Data

No. 12/401,476, filed on Mar. 10, 2009, now Pat. No. 8,767,837, which is a division of application No. 10/510,701, filed as application No. PCT/JP03/04598 on Apr. 11, 2003, now Pat. No. 8,315,313.

(51) Int. Cl.

| | | |
|---|---|---|
| *H04N 19/44* | (2014.01) | |
| *H04N 19/184* | (2014.01) | |
| *H04N 21/44* | (2011.01) | |
| *H04N 21/234* | (2011.01) | |
| *H04N 21/24* | (2011.01) | |
| *H04N 19/61* | (2014.01) | |
| *H04N 21/236* | (2011.01) | |
| *H04N 21/434* | (2011.01) | |
| *H04N 19/15* | (2014.01) | |
| *H04N 19/46* | (2014.01) | |
| *G11B 20/10* | (2006.01) | |

(52) U.S. Cl.
CPC ......... *H04N 19/152* (2014.11); *H04N 19/184* (2014.11); *H04N 19/44* (2014.11); *H04N 19/46* (2014.11); *H04N 19/61* (2014.11); *H04N 21/23424* (2013.01); *H04N 21/23614* (2013.01); *H04N 21/2401* (2013.01); *H04N 21/4348* (2013.01); *G11B 20/10* (2013.01); *G11B 20/10527* (2013.01)

(56) References Cited

U.S. PATENT DOCUMENTS

| | | | |
|---|---|---|---|
| 5,877,812 A | 3/1999 | Krause et al. | |
| 6,011,868 A | 1/2000 | van den Branden | |
| 6,094,455 A | 7/2000 | Katta | |
| 6,137,946 A | 10/2000 | Ando | |
| 6,219,381 B1 | 4/2001 | Sawada et al. | |
| 6,310,915 B1* | 10/2001 | Wells | H04N 21/23406 348/405.1 |
| 6,408,030 B1 | 6/2002 | Koda | |
| 6,453,115 B1* | 9/2002 | Boyle | G11B 20/10 386/346 |
| 6,574,368 B1* | 6/2003 | Boon | H04N 21/23655 375/E7.076 |
| 6,611,624 B1 | 8/2003 | Zhang et al. | |
| 6,614,442 B1* | 9/2003 | Ouyang | H04N 19/51 345/545 |
| 6,671,323 B1 | 12/2003 | Tahara et al. | |
| 6,754,276 B1 | 6/2004 | Harumoto et al. | |
| 6,823,010 B1 | 11/2004 | Curet et al. | |
| 7,471,298 B1* | 12/2008 | Noonburg | H04N 19/186 345/531 |
| 2001/0052036 A1 | 12/2001 | Suh et al. | |
| 2002/0154694 A1 | 10/2002 | Birch | |

FOREIGN PATENT DOCUMENTS

| | | | |
|---|---|---|---|
| GB | 2 344 031 A | | 5/2000 |
| JP | 8-251582 | | 9/1996 |
| JP | 2000-78569 | | 3/2000 |
| JP | 2001-197495 A | | 7/2001 |
| JP | 2001-346163 | | 12/2001 |
| JP | 2002-112149 | | 4/2002 |
| JP | 2003-179665 A | | 6/2003 |
| WO | WO 0046997 | * | 8/2000 |

OTHER PUBLICATIONS

Jordi Ribas-Corbera, et al., "A generalized hypothetical reference decoder for H.26L", ITU-T, Video Coding Experts Group, VCEG-N58, XP-002421825, Sep. 24, 2001, pp. 1-15.

Hiroshi Fujiware, "Point-Illustrated Style Latest MPEG Textbook", ASCII Co., Ltd., Aug. 1. 1994, pp. 155-165.

Japanese Office Action dated Nov. 29, 2011, issued for JP Application No. 2010-028883.

European Search Report dated Dec. 29, 2011, issued for EP Application No. EP 11 17 8600.

European Search Report dated Dec. 30, 2011, issued for EP Application No. EP 11 17 8607.

European Search Reoprt dated Dec. 29, 2011, issued for EP Application No. EP 11 17 8598.

Jordi Ribas-Corbera et al., "A Generalized Hyopthetical Reference Decoder for H.26L," 14. VCEG Meeting, Sep. 24, 2001-Sep. 27, 2001, Santa Barbara, California, U.S. Sep. 25, 2001, ISSN: 0000-0460.

Hannuksela, "Complexity-Constrained Generalized HRD," 2. JVT Meeting, Jan. 29, 2002-Feb. 1, 2002, Geneva, CH, Feb. 1, 2002, ISSN: 0000-0443.

Wiegand,"Joint Video Team (JVT) of ISO/IEC MPEG and ITU-T VCEG," "Joint Model No. 1, Revision 1 (JM-1r1)," 1. JVT Meeting Dec. 3, 2001-Dec. 7, 2001, Pattaya, TH, Dec. 6, 2001, ISSN: 0000-0444.

Office Action dated Sep. 25, 2012 in Japanese Patent Application No. 2010-028883.

Office Action dated Oct. 16, 2012 in Japanese Patent Application No. 2009-108322.

Japanese Office Action dated Aug. 13, 2013 in Patent Application No. 2012-039764.

Combined Chinese Office Action and Search Report dated Jun. 24, 2013 in Patent Application No. 200910224926.8 with English Translation.

Jordi Ribas-Corbera et al., "A Generalized Hypothetical Reference Decoder for H.26L", ITU—Telecommunications Standardization Sector, Study Group 16 Question 6,Video Coding Experts Group (VCEG), 14$^{th}$ Meeting, Sep. 24-27, 2001, 15 pages, (Reference Previously Filed—Filing "Our Comments" with Partial English Translation, only, 2 pages).

\* cited by examiner

ENCODING DEVICE AND METHOD, DECODING DEVICE AND METHOD, EDITING DEVICE AND METHOD, RECORDING MEDIUM, AND PROGRAM

CROSS REFERENCE TO RELATED APPLICATION

The present continuation application claims the benefit of priority under 35 U.S.C. § 120 to U.S. application Ser. No. 14/293,553, filed Jun. 2, 2014, which is a continuation of U.S. application Ser. No. 12/401,476, filed on Mar. 10, 2009, which is a division of U.S. application Ser. No. 10/510,701 filed Oct. 15, 2004, which is a National Stage of PCT/JP03/04598, filed Apr. 11, 2003, and claims the benefit of priority under 35 U.S.C. § 119 of Japanese Application No. 2002-125298, filed Apr. 26, 2002. The entire contents of which are incorporated herein by reference.

TECHNICAL FIELD

The present invention relates to encoding devices and methods, decoding devices and methods, editing devices and methods, storage media, and programs. In particular, the present invention relates to an encoding device and a method, a decoding device and a method, an editing device and a method, a storage medium, and a program which are preferably used for transmitting/receiving image information (bitstreams), compressed by motion compensation and orthogonal transformation, such as a discrete cosine transform or Karhunen-Loeve transform, through a network medium, such as satellite broadcast, cable television broadcast, or the Internet, or are preferably used for processing image information on a storage medium, such as an optical disk, a magnetic disk, or a flash memory.

BACKGROUND ART

In recent years, devices that digitally process image information with an aim of efficient transmission and storage of information and that are compliant with an MPEG (Moving Picture Expert Group) standard or the like for compression by motion compensation and orthogonal transformation, such as a discrete cosine transform, using an image-information-specific redundancy are becoming widespread in both information distribution by broadcast stations and information reception by general homes.

In particular, MPEG-2 (ISO/IEC 13818-2) is a standard that was defined as a universal image compression scheme and that covers both interlaced scan images and progressive scan images as well as standard resolution images and high-definition images. MPEG-2 is widely used in a wide variety of applications for professional and consumer applications, for example, as represented by a DVD (Digital Versatile Disk) standard.

Through the use of the MPEG-2 compression scheme, for example, assigning a bit rate (bit rate) of 4 to 8 Mbps to a standard-resolution interlaced scan image having 720×480 pixels and a bit rate of 18 to 22 Mbps to a high-resolution interlaced scan image having 1920×1088 pixels can achieve favorable images with high compression ratios.

MPEG-2 was mainly intended for high-quality coding suitable for broadcasting, but was not compatible with a coding scheme employing a higher compression ratio and thus an MPEG-4 coding scheme has been standardized. With regard to an image coding scheme, the scheme was approved as an ISO/IEC 14496-2 international standard in December 1998.

In addition, in recent years, with an initial purpose of image coding for videoconferences, the standardization of what is called H.26L (ITU/T Q6/16 VCEG) by ITU-T (International Telecommunication Union-Telecommunication Standardization Sector) is in progress. H.26L requires a larger amount of computation for encoding and decoding, compared to MPEG-2 and MPEG-4 coding schemes, but is known as achieving higher coding efficiency.

Further, as part of MPEG-4 activities, the standardization of a coding technique for realizing higher coding efficiency based on H.26L is currently underway by JVT (Joint Video Team) in cooperation with ITU-T.

Now, a description is given of image compression using motion compensation and orthogonal transformation, such as a discrete cosine transform or Karhunen-Loeve transform. FIG. 1 is a diagram showing the configuration of one example of a conventional image-information encoding device.

In an image-information encoding device 10 shown in FIG. 1, image information provided by an analog signal input from an input terminal 11 is converted by an A/D converter 12 into a digital signal. The screen rearranging buffer 13 rearranges frames in accordance with a GOP (Group of Pictures) structure of image information supplied from the A/D converter 12.

Here, with respect to an image on which intra (intra-image) encoding is performed, the screen rearranging buffer 13 supplies image information of an entire frame to an orthogonal transformation unit 15. The orthogonal transformation unit 15 performs a discrete cosine transform or Karhunen-Loeve transform on the image information and supplies a transform coefficient to a quantization unit 16. The quantization unit 16 performs quantization processing on the transform coefficient supplied from the orthogonal transformation unit 15.

Based on a quantization scale and a transform coefficient quantized and supplied by the quantization unit 16, a reversible encoding unit 17 determines an encoding mode, performs variable-length encoding or reversible encoding, such as arithmetic encoding, on the encoding mode to create information to be inserted into the header portion of an image encoding unit. The reversible encoding unit 17 then supplies the encoded encoding-mode to a storage buffer 18 for storage. The encoded encoding-mode is output from an output terminal 19 as compressed image information.

The reversible encoding unit 17 also performs variable-length encoding or reversible encoding, such as arithmetic encoding, on the quantized transform coefficient and supplies the encoded transform coefficient to the storage buffer 18 for storage. The encoded transform coefficient is output from the output terminal 19 as compressed image information.

The behavior of the quantization unit 16 is controlled by a rate controller 20 in accordance with the amount of data of transform coefficient stored in the storage buffer 18. The rate controller 20 also supplies a quantized transform coefficient to a dequantization unit 21. The dequantization unit 21 dequantizes the quantized transform coefficient. An inverse orthogonal transformation unit 22 performs inverse orthogonal transformation processing on the dequantized transform coefficient to generate decoded image information and supplies the information to a frame memory 23 for storage.

With respect to an image on which inter (inter-image) encoding is performed, the screen rearranging buffer 13 supplies image information to a motion prediction/compensation unit 24. The motion prediction/compensation unit 24 simultaneously retrieves image information that is referred to from the frame memory 23 and performs motion prediction/compensation processing on the image information to generate reference image information. The motion prediction/compensation unit 24 supplies the generated reference image information to an adder 14. The adder 14 converts the reference image information into a signal indicating a difference relative to corresponding image information. At the same time, the motion prediction/compensation unit 24 also supplies motion vector information to the reversible encoding unit 17.

The reversible encoding unit 17 determines an encoding mode from the quantization scale and the transform coefficient quantized and supplied by the quantization unit 16 and the motion vector information supplied from the motion prediction/compensation unit 24. The reversible encoding unit 17 performs variable-length encoding or reversible encoding, such as arithmetic encoding on the determined encoding mode to generate information to be inserted into the header portion of an image encoding unit. The reversible encoding unit 17 supplies the encoded encoding-mode to the storage buffer 18 for storage. The encoded encoding-mode is output as compressed image information.

The reversible encoding unit 17 performs variable-length encoding or reversible encoding processing, such as arithmetic encoding, on the motion vector information to generate information to be inserted into the header portion of an image encoding unit.

Unlike intra encoding, in the case of inter encoding, image information input to the orthogonal transformation unit 15 is a difference signal provided by the adder 14. Since other processing is analogous to that for the compressed image information on which intra encoding is performed, the description thereof is omitted.

Next, the configuration of one embodiment of an image-information decoding device corresponding to the above-described image-information encoding device 10 will be described with reference to FIG. 2. In an image-information decoding device 40 shown in FIG. 2, compressed image information input from an input terminal 41 is temporarily stored by a storage buffer 42 and is then transferred to a reversible decoding unit 43.

In accordance with a predetermined compressed-image-information format, the reversible decoding unit 43 performs processing, such as variable length decoding or arithmetic decoding, on the compressed image information. The reversible decoding unit 43 then obtains encoding mode information stored in a header portion and supplies the encoding mode information to a dequantization unit 44. Similarly, the reversible decoding unit 43 obtains a quantized transform coefficient and supplies the coefficient to the dequantization unit 44. When a frame to be decoded has been subjected to inter encoding, the reversible decoding unit 43 also decodes motion vector information stored in the header portion of compressed image information and supplies the information to a motion prediction/compensation unit 51.

The dequantization unit 44 dequantizes the quantized transform coefficient supplied from the reversible decoding unit 43 and supplies the resulting transform coefficient to an inverse orthogonal transformation unit 45. In accordance with a predetermined compressed-image-information format, the inverse orthogonal transformation unit 45 performs inverse orthogonal transformation, such as inverse discrete cosine transform or Karhunen-Loeve transform, on the transform coefficient.

Here, when a frame of interest has been subjected to intra encoding, image information subjected to the inverse orthogonal transformation processing is stored in a screen rearranging buffer 47. After the image information is subjected to D/A conversion processing by a D/A converter 48, the resulting information is output from an output terminal 49.

Also, when a frame of interest has been subjected to inter encoding, the motion prediction/compensation unit 51 generates a reference image in accordance with motion vector information that has been subjected to reversible decoding processing and image information stored in a frame memory 50, and supplies the reference image to an adder 46. The adder 46 combines the reference image with the output from the inverse orthogonal transformation unit 45. Since other processing is analogous to that for the frame that has been subjected to intra encoding, the description thereof is omitted.

For a coding scheme (hereinafter referred to as "JVT Codec") being standardized by the above-mentioned Joint Video Team, various schemes have been under consideration in order to improve the coding efficiency of MPEG-2, MPEG-4, and so on. For example, for the transformation scheme of a discrete cosine transform, an integer-coefficient transform with a 4×4 block size is used. Further, the block size for motion compensation is variable, so that more optimum motion compensation can be performed. The basic scheme, however, can be realized in the same manner as the encoding scheme performed in the image-information encoding device 10 shown in FIG. 1.

Thus, the JVT codec can perform decoding using essentially the same scheme as the decoding scheme performed in the image-information decoding device 40 shown in FIG. 2.

Meanwhile, in order to maintain the compatibility between different encoding devices (decoders) and to prevent buffer overflow or underflow, The MPEG and ITU-T use a buffer model. A virtual decoder buffer model is standardized and an encoding device (encoder) performs encoding so that the virtual decoder buffer does not fail. This makes it possible to prevent buffer overflow or underflow at the decoder side and to maintain the compatibility.

A virtual buffer model according to the MPEG will be described with reference to FIG. 3. In the following description, R indicates an input bit rate for a decoder buffer, B indicates the size of the decoder buffer, F indicates the amount of buffer occupied when the decoder extracts a first frame from the buffer, and D indicates delay time therefor.

Bit amounts of each frame at time t0, t1, t2, . . . are indicated by b0, b1, b2 . . . , and so on.

When the frame rate is M, the following expression is satisfied:

$$t_{i+1} - t_i = 1/M$$

When $B_i$ indicates the amount of buffer occupancy immediately before bit amount $b_i$ of a frame at time $t_i$ is extracted, expression (1) below is satisfied:

$$B_0 = F$$

$$B_{i+1} = \min(B, B_i - b_i + R(t_{i+1} - t_2)) \quad (1)$$

In this case, for a fixed bit rate encoding scheme for MPEG-2, the encoder must perform encoding so as to satisfy condition (2) below:

$$Bi \leq B$$

$$Bi - bi > 0 \quad (2)$$

As long as such a condition is satisfied, the encoder should not perform encoding that causes buffer overflow and underflow.

Further, for a variable bit rate encoding scheme for MPEG-2, the input bit rate R is a maximum bit rate defined by a profile and a level and is given by F=B. Thus, expression (1) can be rewritten as expression (3)

$$B_0 = B$$

$$B_{i+1} = \min(B, B_i - b_i + R_{max}(t_{i+1} - t_i)) \quad (3)$$

In this case, the encoder must perform encoding so as to satisfy expression (4) below:

$$B_i - b_i > 0 \quad (4)$$

When this condition is satisfied, the encoder will perform encoding that does not cause buffer underflow at the decoder side. When the decoder buffer becomes full, the encoder buffer is empty and this indicates that no encoding bitstream is generated. Thus, there is no need for the encoder to perform monitoring so that the buffer overflow of the decoder does not occur.

In the MPEG, encoding is performed so as to comply with the above-described buffer restrictions in accordance with a buffer size and a bit rate defined by each profile and level. Thus, a decoder that conforms to each profile and level can perform decoding without causing failure of the bitstream.

In practice, however, without the use of a buffer size and a bit rate defined by a profile and a level, there are cases in that a bitstream can be decoded.

For example, a bitstream encoded with a bit rate R, a buffer B, and initial delay time F, i.e., (R, B, F), can be decoded by a decoder having a larger buffer size B' (B'>B). The bitstream can also be decoded at a higher bit rate R' (R'>R).

For example, when the decoding bit rate of a decoder is lower than an encoding bit rate, a decoder that has a sufficiently large buffer size can perform decoding.

In this manner, when a predetermined bitstream is given, a minimum buffer size $B_{min}$ needed to decode the bitstream exists at each bit rate. Such a relationship is shown in FIG. 4.

The standardization of JVT Codec has been in progress so that decoding is possible not only with a fixed bit rate and a buffer size defined by each profile and level but also is possibly by a decoder having the condition shown in FIG. 4. This has the objective of allowing decoding even if the decoding bit rate and buffer size of an encoder and the decoding bit rate and buffer size of a decoder are not necessarily the same. By achieving the objective, for example, a decoder having a high decoding bit rate can reduce a buffer size.

However, such information varies in a bitstream with time. Thus, there is a problem in that, even when decoding is possible under a predetermined condition, decoding may be impossible under another condition, since the restrictions for decoder compatibility has been relaxed. For example, when such a characteristic of (R, B) varies with time, there is a problem in that, even when decoding is possible at predetermined time, decoding may be impossible at another time.

Further, there is a problem in that decoding is not always possible in the case of shifting to another scene or another channel due to random access or the like. There is also a problem in that the decoding possibility cannot be guaranteed when bitstream-level editing, such as splicing (splicing), is performed.

DISCLOSURE OF INVENTION

The present invention has been made in view of such situations, and an object of the present invention is to efficiently determine the decoding possibility of a bitstream and to simplify bitstream editing, such as splicing.

An encoding device of the present invention includes generating means for generating a header to which reference is made as needed during decoding; encoding means for encoding the header generated by the generating means and an input image signal, respectively; and outputting means for multiplexing the header and the image signal encoded by the encoding means and outputting a bitstream. The encoding device is characterized in that the generating means generates the header containing buffer characteristic information about buffering during decoding of the bitstream.

The generating means can generate the header containing the buffer characteristic information for each predetermined section randomly accessible in the bitstream.

The generating means can generate the header containing the buffer characteristic information for an entire sequence of the bitstream.

The buffer characteristic information can contain all of a minimum bit rate, a minimum buffer size B, and a minimum delay amount which are decodable during decoding of the bitstream.

An encoding method of the present invention includes a generating step of generating a header to which reference is made as needed during decoding; an encoding step of encoding the header generated in the generating step and an input image signal, respectively; and an output controlling step of controlling output of a bitstream in which the header and the image signal encoded by the processing in the encoding step are multiplexed. The encoding method is characterized in that the processing in the generating step generates the header containing buffer characteristic information about buffering during decoding of the bitstream.

A program for a first storage medium of the present invention includes a generating step of generating a header to which reference is made as needed during decoding; an encoding step of encoding the header generated by the processing in the generating step and an input image signal, respectively; and an output controlling step of controlling output of a bitstream in which the header and the image signal encoded by the processing in the encoding step are multiplexed. The program is characterized in that the processing in the generating step generates the header containing buffer characteristic information about buffering during decoding of the bitstream.

A first program of the present invention causes a computer to execute processing that includes a generating step of generating a header to which reference is made as needed during decoding; an encoding step of encoding the header generated in the generating step and an input image signal, respectively; and an output controlling step of controlling output of a bitstream in which the header and the image signal encoded by the processing in the encoding step are multiplexed. The program is characterized in that the processing in the generating step generates the header containing buffer characteristic information about buffering during decoding of the bitstream.

A decoding device of the present invention is characterized by including searching means for searching for a header in an input bitstream; and decoding means for reading buffer characteristic information about buffering, which information contained in the header found by the searching means, and for decoding the bitstream in accordance with the read buffer characteristic information.

The buffer characteristic information can contain all of a minimum bit rate, a minimum buffer size, and a minimum delay amount which are decodable during decoding of the bitstream.

A decoding method of the present invention is characterized by including a searching step of searching for a header in an input bitstream; and a decoding step of reading buffer characteristic information about buffering, which information contained in the header found by the processing in the searching step, and of decoding the bitstream in accordance with the read buffer characteristic information.

A program for a second storage medium of the present invention is characterized by including a searching step of searching for a header in an input bitstream; and a decoding step of reading buffer characteristic information about buffering, which information contained in the header found by the processing in the searching step, and of decoding the bitstream in accordance with the read buffer characteristic information.

A second program of the present invention is characterized by causing a computer to execute processing that includes a searching step of searching for a header in an input bitstream; and a decoding step of reading buffer characteristic information about buffering, which information contained in the header found by the processing in the searching step, and of decoding the bitstream in accordance with the read buffer characteristic information.

An editing device of the present invention includes searching means for searching for a header in an input bitstream; determining means for reading buffer characteristic information about buffering, which information contained in the header found by the searching means, and for determining whether or not the bitstream can be edited in accordance with the read buffer characteristic information; and editing means for editing the bitstream when the determining means determines that the bitstream can be edited. The editing device is characterized in that, when a characteristic curve created from the information contained in the header in a first bitstream is always located above or is the same as a characteristic curve created from the information contained in the header in a second bitstream, the determining means determines that editing using the first bitstream and the second bitstream is possible.

An editing method of the present invention includes a searching step of searching for a header in an input bitstream; a determining step of reading buffer characteristic information about buffering, which information contained in the header found by the processing in the searching step, and of determining whether or not the bitstream can be edited in accordance with the read information; and an editing step of editing the bitstream when the processing in the determining step determines that the bitstream can be edited. The editing method is characterized in that, when a characteristic curve created from the information contained in the header in a first bitstream is always located above or is the same as a characteristic curve created from the information contained in the header in a second bitstream, the processing in the determining step determines that editing using the first bitstream and the second bitstream is possible.

A program for a third storage medium of the present invention includes a searching step of searching for a header in an input bitstream; a determining step of reading buffer characteristic information about buffering, which information contained in the header found by the processing in the searching step, and of determining whether or not the bitstream can be edited in accordance with the read information; and an editing step of editing the bitstream when the processing in the determining step determines that the bitstream can be edited. The program is characterized in that, when a characteristic curve created from the information contained in the header in a first bitstream is always located above or is the same as a characteristic curve created from the information contained in the header in a second bitstream, the processing in the determining step determines that editing using the first bitstream and the second bitstream is possible.

A third program of the present invention causes a computer to execute processing that includes a searching step of searching for a header in an input bitstream; a determining step of reading buffer characteristic information about buffering, which information contained in the header found by the processing in the searching step, and of determining whether or not the bitstream can be edited in accordance with the read information; and an editing step of editing the bitstream when the processing in the determining step determines that the bitstream can be edited. The program is characterized in that, when a characteristic curve created from the information contained in the header in a first bitstream is always located above or is the same as a characteristic curve created from the information contained in the header in a second bitstream, the processing in the determining step determines that editing using the first bitstream and the second bitstream is possible.

According to the encoding device and the method as well as the first program of the present invention, buffer characteristic information about buffering during decoding of a bitstream is contained in a header that is encoded and multiplexed with the bitstream. This can prevent a decoding side from causing buffer failure.

According to the decoding device and the method as well as the second program of the present invention, buffer characteristic information about buffering during decoding, which information contained in a header in an input bitstream, is read and decoding is performed in accordance with the read information.

According to the editing device and the method as well as the third program of the present invention, a determination as to whether an input bitstream can be edited is made by determining whether a characteristic curve created from information contained in a header in a first bitstream is always located above or is the same as a characteristic curve created from information contained in a header in a second bitstream.

BEST MODE FOR CARRYING OUT THE INVENTION

Figure 1:
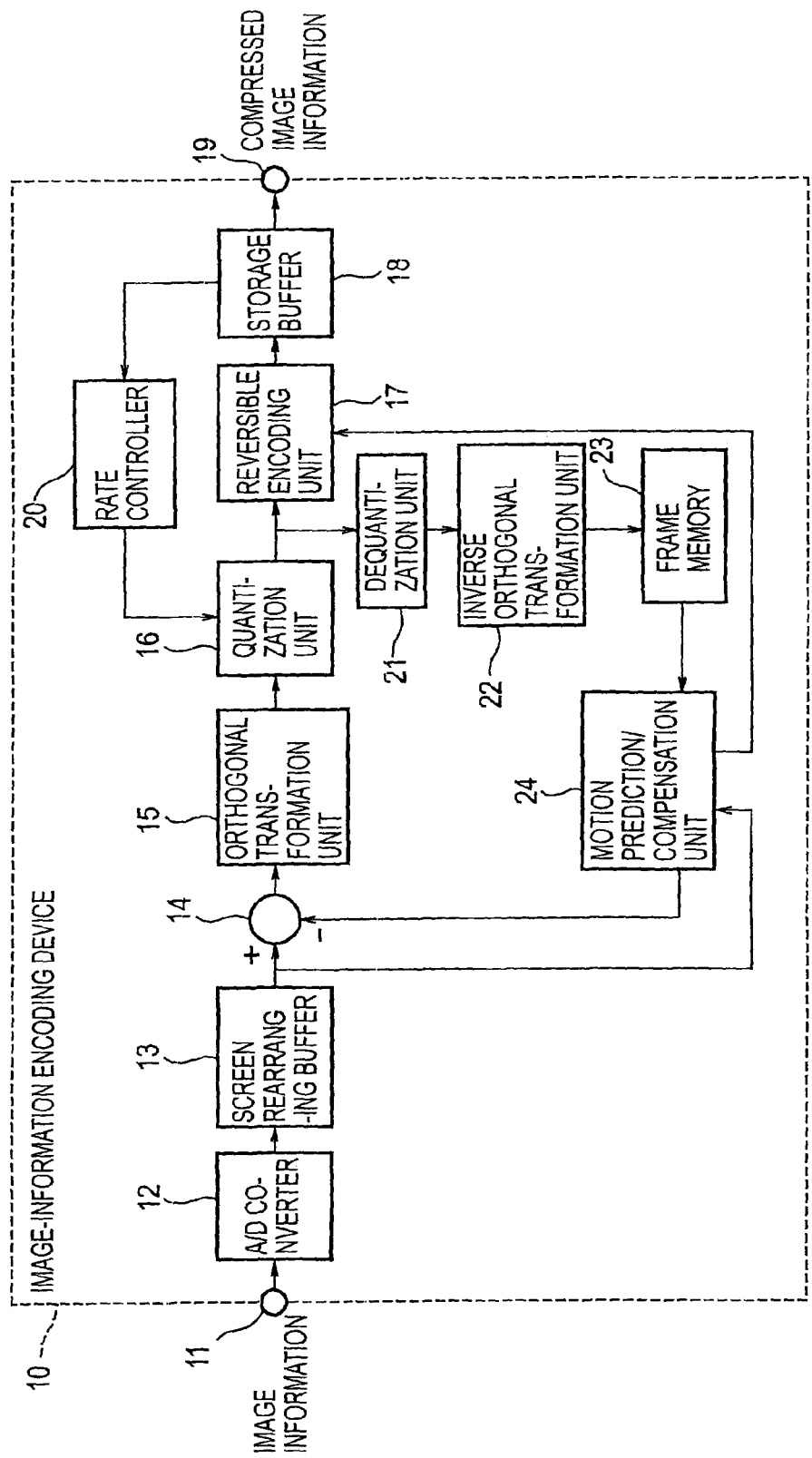
FIG. 1 is a diagram showing the configuration of one example of a conventional image-information encoding device.
Figure 5:
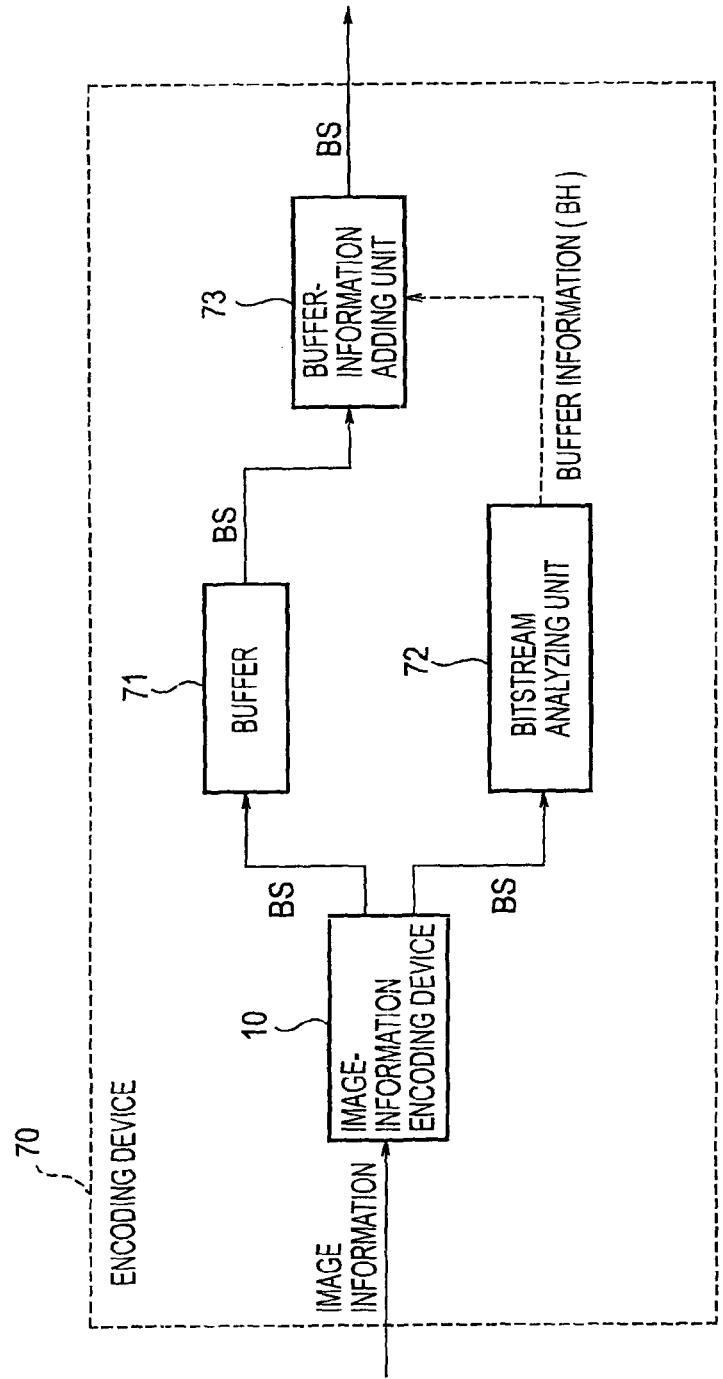
FIG. 5 is a diagram showing the configuration of one embodiment of an encoding device according to the present invention.

An embodiment of the present invention will be described below with reference to the accompanying drawings. FIG. 5 is a diagram showing the configuration of one embodiment of an encoding device according to the present invention. An encoding device 70 shown in FIG. 5 includes the image-information encoding device 10 shown in FIG. 1. Here, the configuration and so on of the image-information encoding device 10 has been described, the description thereof is omitted as appropriate.

Image information input to the image-information encoding device 10 is encoded and is output as compressed image information (BS: bitstream) to a buffer 71 and a bitstream analyzing unit 72. The buffer 71 temporarily stores the input bitstream and outputs the bitstream to a buffer-information adding unit 73 as needed. The bitstream analyzing unit 72 checks the buffer occupancy state of a predetermined section in a bitstream, for example, a section between GOPs or random access points, and supplies the information to the buffer-information adding unit 73 as buffer information BH. Here, the "random access point" refers to a predetermined section randomly accessible in a bitstream in a JVT standard. Similarly, the "GOP" refers to a predetermined section randomly accessible in an MPEG-2/MPEG-4 standard.

The buffer-information adding unit 73 adds the input buffer information BH to an input bitstream and outputs the resulting information.

In this case, as one example of analysis performed by the bitstream analyzing unit 72, a description is given of an exemplary case in which a buffer occupancy state is checked between random access points and the information of the buffer occupancy state is encoded as header information for each random access point to thereby constitute a bitstream. While the description here is described in such a manner, the encoding may be performed in units of GOP or another arbitrarily unit may be used. Thus, needless to say, the present invention is applicable to a case in which another unit is used in stead of a unit described below.

Figure 6:
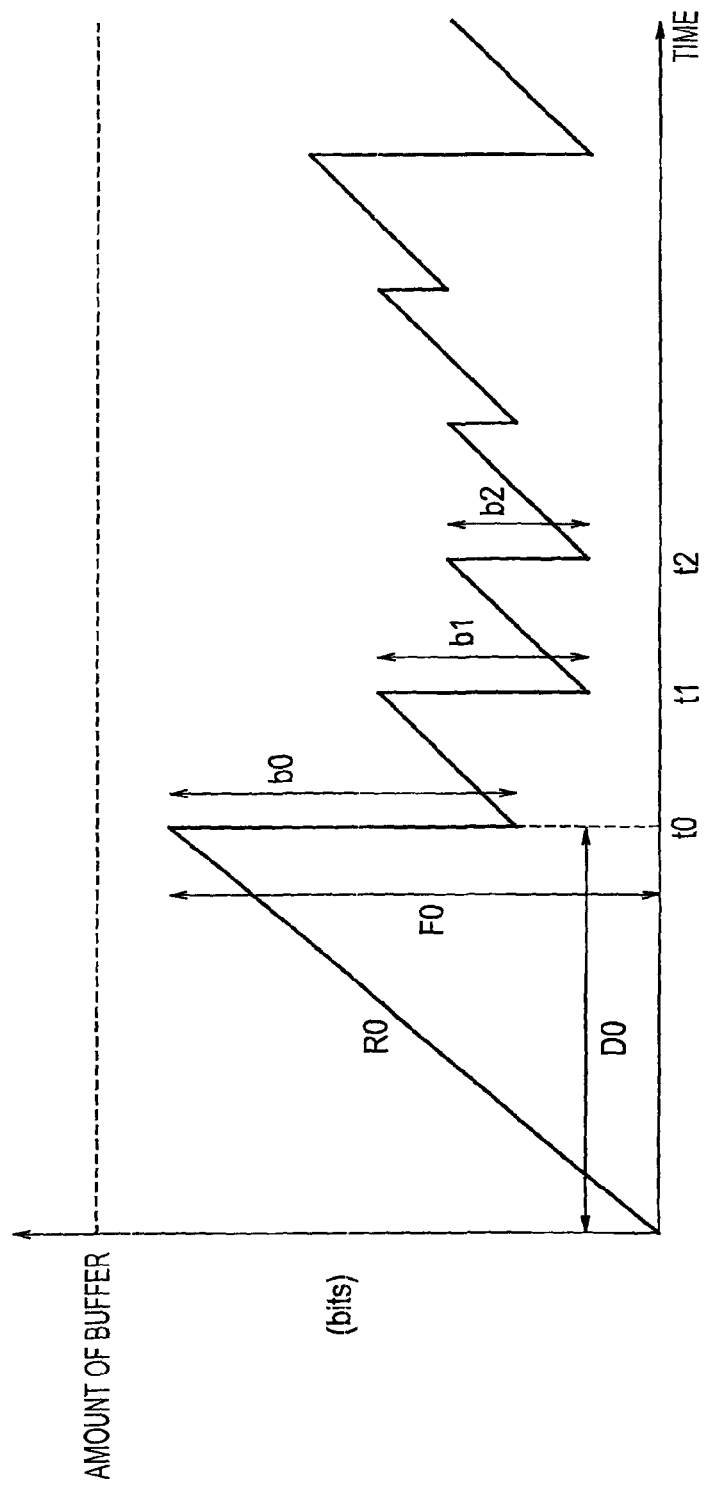
FIG. 6 is graph for describing the amount of buffer.

A method for determining the characteristic of $(R_{min}, B_{min})$ will be described with reference to FIG. 6. $R_{min}$ herein indicates the minimum value of an input bit rate R for the buffer and $B_{min}$ indicates the minimum value of a buffer size B.

When the bit rate R of a predetermined bitstream is given, the minimum buffer size $B_{min}$ that is decodable by a decoding device (e.g., having a configuration shown in FIG. 7) for decoding the bitstream at the decoding bit rate R is determined, for example, in the following manner.

The number of frames between predetermined access points is indicated by N. The amount of bits generated for each frame is b(i) (i=1, N), the amount of buffer occupancy immediately before data of each frame is extracted from the buffer is B(i), and the amount of buffer occupancy immediately after the extraction is B2(i). The amount of buffer of the encoding device is indicated by B. Then, the following is given:

$$B2(i)=B(i)-b(i)$$

$$B(i+1)=B2(i)+R/(\text{Frame Rate}) \quad (5)$$

where if $(B(i+1)>B)B(i+1)=B$ and the maximum value of B(i) is B. Further, suppose a delay amount F satisfies F=B.

In this case, $B_{min}$ can be determined by expression (6) below:

$$B_{min}=B-\min(B2(i)) \quad (6)$$

When R is assumed to be $R_{min}$ in this case, the above described method can determine $(R_{min}, B_{min})$.

Next, one example of a method for determining $(R_{min}, B_{min}, F_{min})$ will be described. Let $B=B_{min}$, $R=R_{min}$. As in expression (5), expression (7) below is satisfied $$B2(i)=B(i)-b(i)$$

$$B(i+1)=B2(i)+R/(\text{Frame Rate}) \quad (7)$$

where monitoring for an underflow is performed in accordance with the following condition.

if $(B2(i)<0)\{F_{min}=F_{min}+(0-B2(i)); B2(i)=0;\}$ $F_{min}$ is initialized to "0" at the start of each random access point. Monitoring for an overflow is similarly performed in accordance with the following condition.

if $(B(i+1)>B)B(i+1)=B$ $(R_{min}, B_{min}, F_{min})$ is determined by performing the above-described checking on every frame between random access points.

$(R_{min}, B_{min}, F_{min})$ described above may be checked by a predetermined number thereof or may be defined by only independent combinations thereamong. The characteristic determined as described above is as shown in FIG. 4. Portions between points are linearly interpolated. The values of $(R_{min}, B_{min}, F_{min})$ obtained as described above, i.e., buffer information BH, are inserted into a predetermined position in a bitstream by the buffer-information adding unit 73, are encoded, and are output.

Simultaneously with $(R_{min}, B_{min}, F_{min})$ between random accesses, as described above, the bitstream analyzing unit 72 performs similar analysis on the entire bitstream to determine the characteristic of the entire bitstream, i.e., $(R_{min}, B_{min}, F_{min})$ global. The bitstream analyzing unit 72 then supplies the values thereof to the buffer-information adding unit 73 as the buffer information BH.

The bitstream BS output from the image-information encoding device 10 is delayed by a predetermined amount of time by the buffer 71 and is then input to the buffer-information adding unit 73. The buffer-information adding unit 73 inserts the buffer information BH, supplied from the bitstream analyzing unit 72, into a predetermined position in the bitstream and outputs a final output bitstream BS.

In this case, the buffer information BH (or buffer characteristic information) is, for example, $(R_{min}, B_{min}, F_{min})$ and $(R_{min}, B_{min}, F_{min})$ global. The buffer-information adding unit 73 inserts the above-described information into a predetermined position in the bitstream BS. One example of syntax will be described below.

```
RAP_header ( ) {
    RAP_startcode;
    closed_GOP;
    Broken_link;
    NumBufferParam;
    for(i=0;i<NumBufferParam;i++){
        Rate[i];
        Buffer[i];
        F[i];}}
```

($R_{min}$, $B_{min}$, $F_{min}$) between random access points is recorded in, for example, in a random access point header immediately therebefore as the above-noted syntax. "RAP-startcode" is a code that indicates the presence of a RAP header and that indicates the start of the header.

"closed_GOP" is a flag indicating whether either all pictures in the GOP are independent without referring to any picture of another GOP or are dependent on a picture in another GOP while referring thereto. "broken_link" is a flag indicating whether or not a reference image for prediction exits when a bitstream is replaced in front of or behind the GOP by editing or the like.

NumBuffer_Param indicates the number of determined characteristic sets ($R_{min}$, $B_{min}$, $F_{min}$). Rate[i], Buffer[i], and F[i] indicate $R_{min}$, $B_{min}$, and $F_{min}$, respectively. In this case, for example, $R_{min}$ is recorded in the increasing order.

($R_{min}$, $B_{min}$, $F_{min}$) global of an entire bitstream is recorded in, for example, the first sequence header of the bitstream, as in the following syntax:

```
Sequence_header ( ) {
    Sequence_startcode;
    :
    :
    NumBufferParam;
        for(i=0;i<NumBufferParam;i++){
            Rate[i];
            Buffer[i];
            F[i];}}
``` where NumBuffer_Param indicates the number of determined characteristic sets ($R_{min}$, $B_{min}$, $F_{min}$) global. Rate[i], Buffer[i], and F[i] indicate $R_{min}$, $B_{min}$, and $F_{min}$, respectively. In this case, $R_{min}$ is recorded, for example in the increasing order.

After attaching the above-described buffer information BH, the buffer-information adding unit 73 outputs a final output bitstream BS.

In the embodiment of the present invention, as the buffer information BH, the minimum bit rate Rmin, the minimum buffer size Bmin, and the minimum delay amount Fmin are all added to a bitstream in the above description. However, the present invention is not limited to that example, and thus at least one of the minimum bit rate Rmin, the minimum buffer size Bmin, and the minimum delay amount Fmin may be added to a bitstream. For example, a combination of the minimum bit rate Rmin and the minimum buffer size Bmin may be added to a bitstream.

Figure 7:
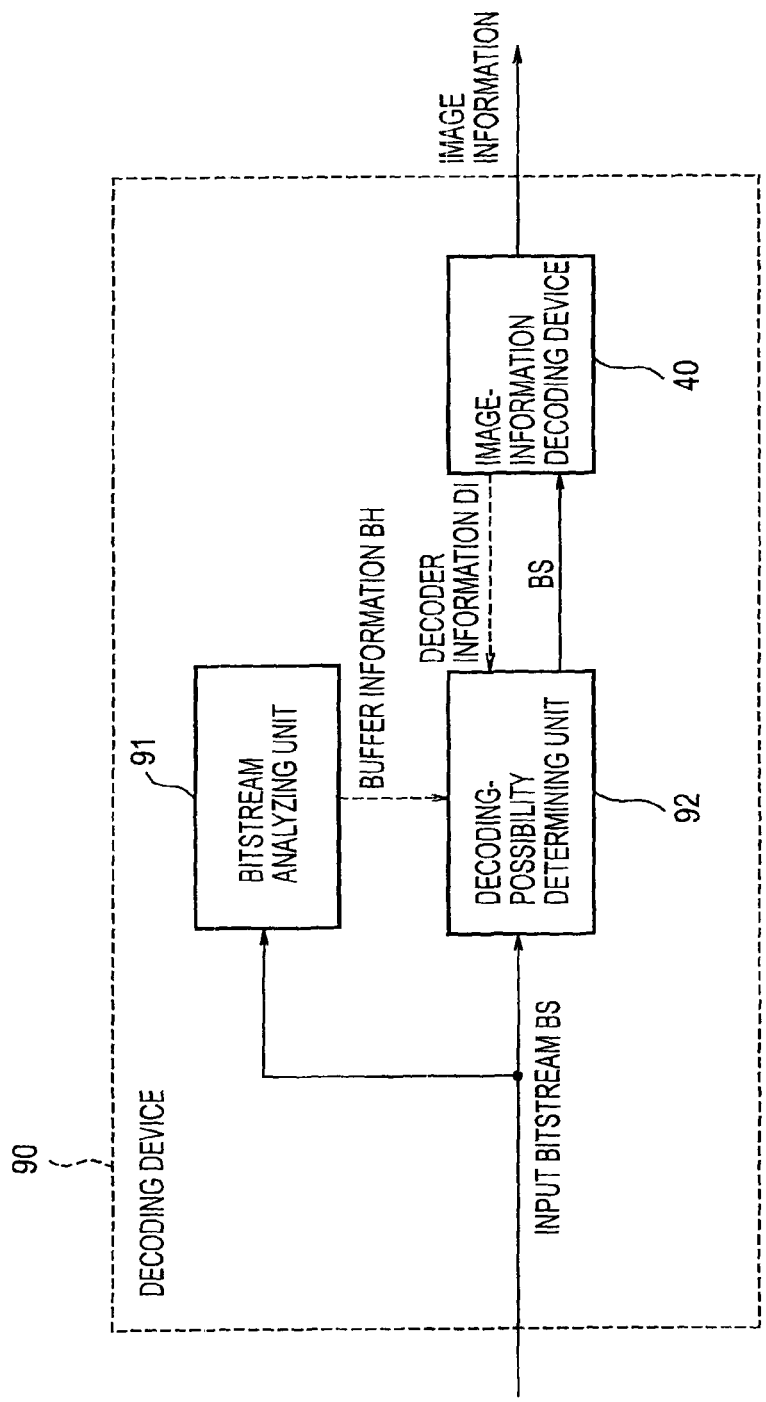
FIG. 7 is a diagram showing the configuration of one embodiment of a decoding device according to the present invention.

FIG. 7 shows one embodiment of a decoding device according to the present invention. A decoding device 90 shown in FIG. 7 corresponds to the encoding device 70 shown in FIG. 5. The decoding device 90 includes the image-information decoding device 40 shown in FIG. 2 therein. A bitstream BS input to the decoding device 90 is supplied to a bitstream analyzing unit 91 a decoding-possibility determining unit 92.

The bitstream analyzing unit 91 decodes buffer information BH in the bitstream and outputs the resulting buffer information BH to the decoding-possibility determining unit 92. The bitstream analyzing unit 91 parses the bitstream to decode ($R_{min}$, $B_{min}$, $F_{min}$) global recorded in the sequence header. The bitstream analyzing unit 91 also decodes ($R_{min}$, $B_{min}$, $F_{min}$) recorded in each random access point header. Those pieces of information are output to the decoding-possibility determining unit 92.

The decoding-possibility determining unit 92 determines whether or not the input bitstream can be decoded without the input bitstream causing buffer failure, in accordance with the buffer information BH and decoder information DI supplied from the image information decoding device 40. Examples of the decoder information DI include a decoder buffer size and a decoding bit rate.

Figure 4:
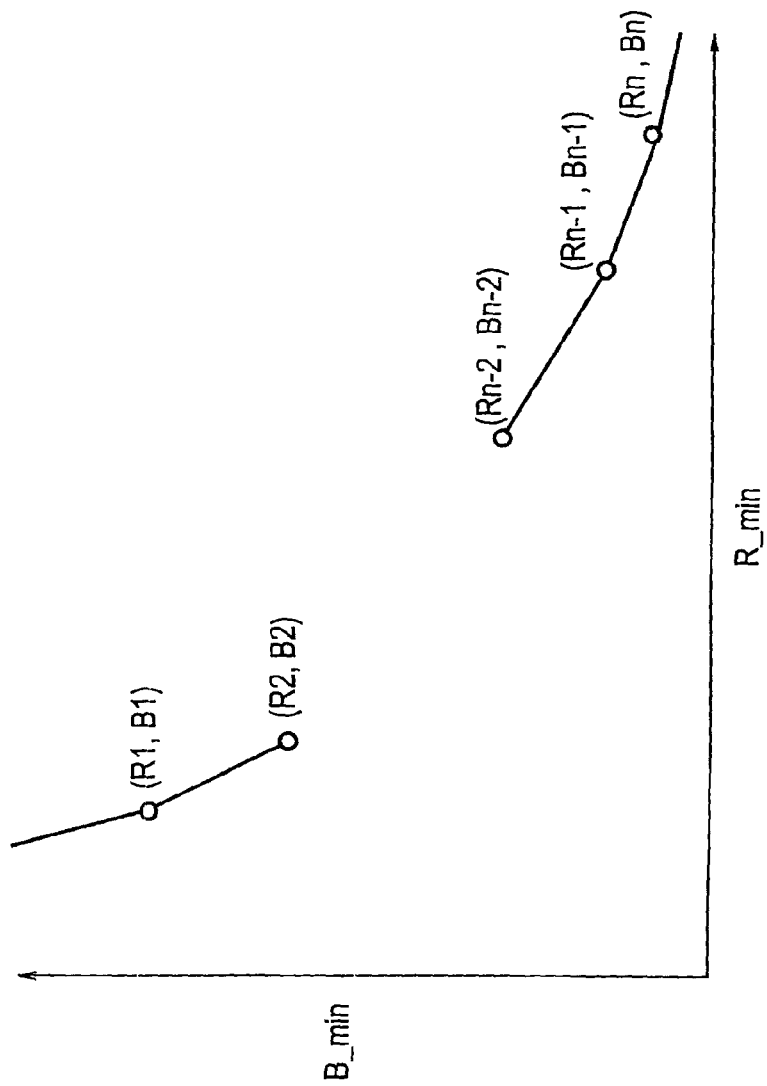
FIG. 4 is a graph for describing the relationship between a bit rate and the amount of buffer.

The decoding-possibility determining unit 92 creates a characteristic curve as shown in FIG. 4, based on ($R_{min}$, $B_{min}$, $F_{min}$) global. Portions between points are linearly interpolated. In this case, a buffer of the decoder (decoding device 90) and the decoding bit rate are located above the characteristic curve formed from ($R_{min}$, $B_{min}$, $F_{min}$) global, it is possible to determine that the input bitstream is decodable. Thus, in such a case, the decoding-possibility determining unit 92 determines that the input bitstream is decodable and supplies the bitstream to the image-information decoding device 40.

Figure 2:
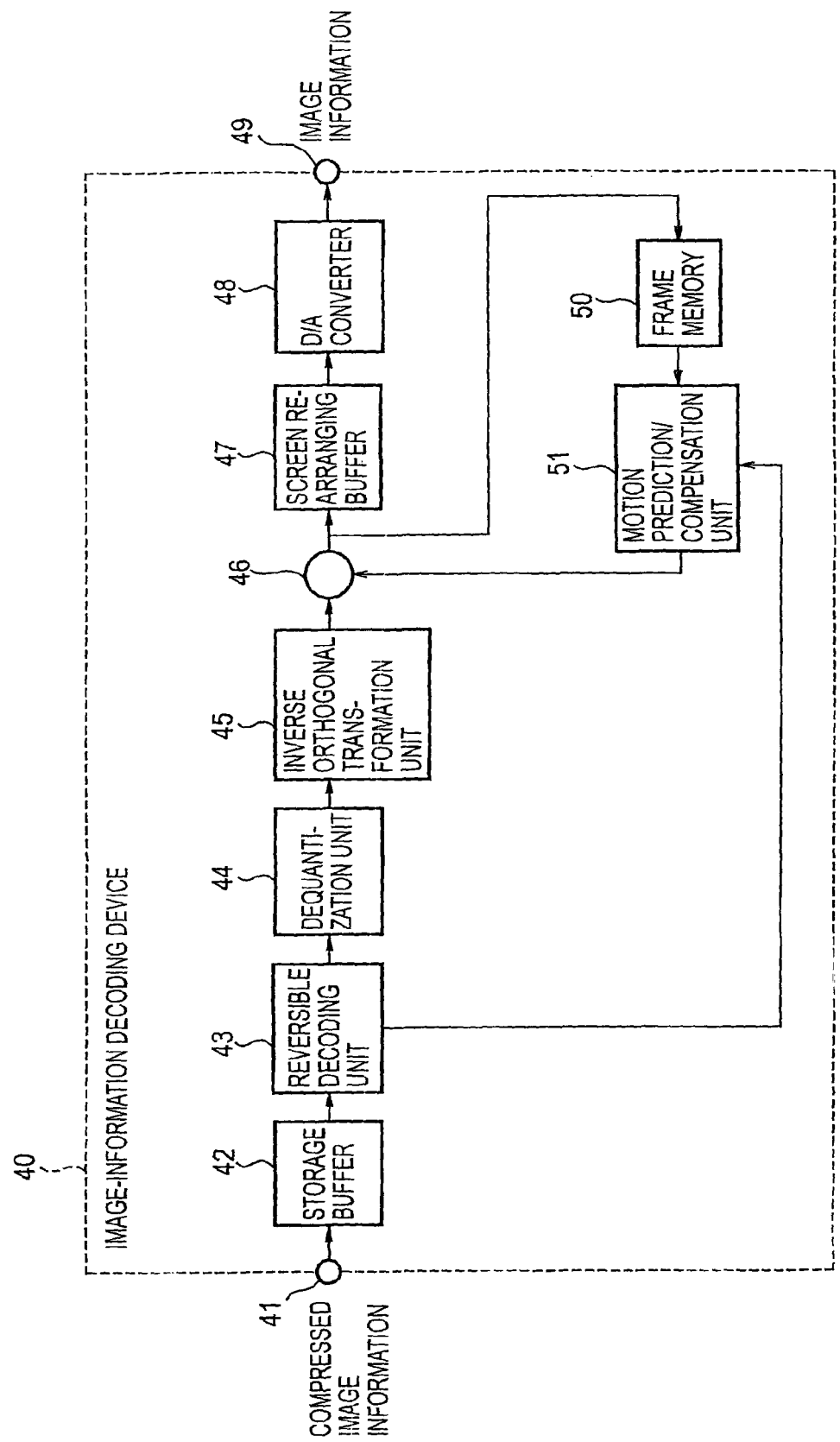
FIG. 2 is a diagram showing the configuration of one example of a conventional image-information decoding device.
Figure 3:
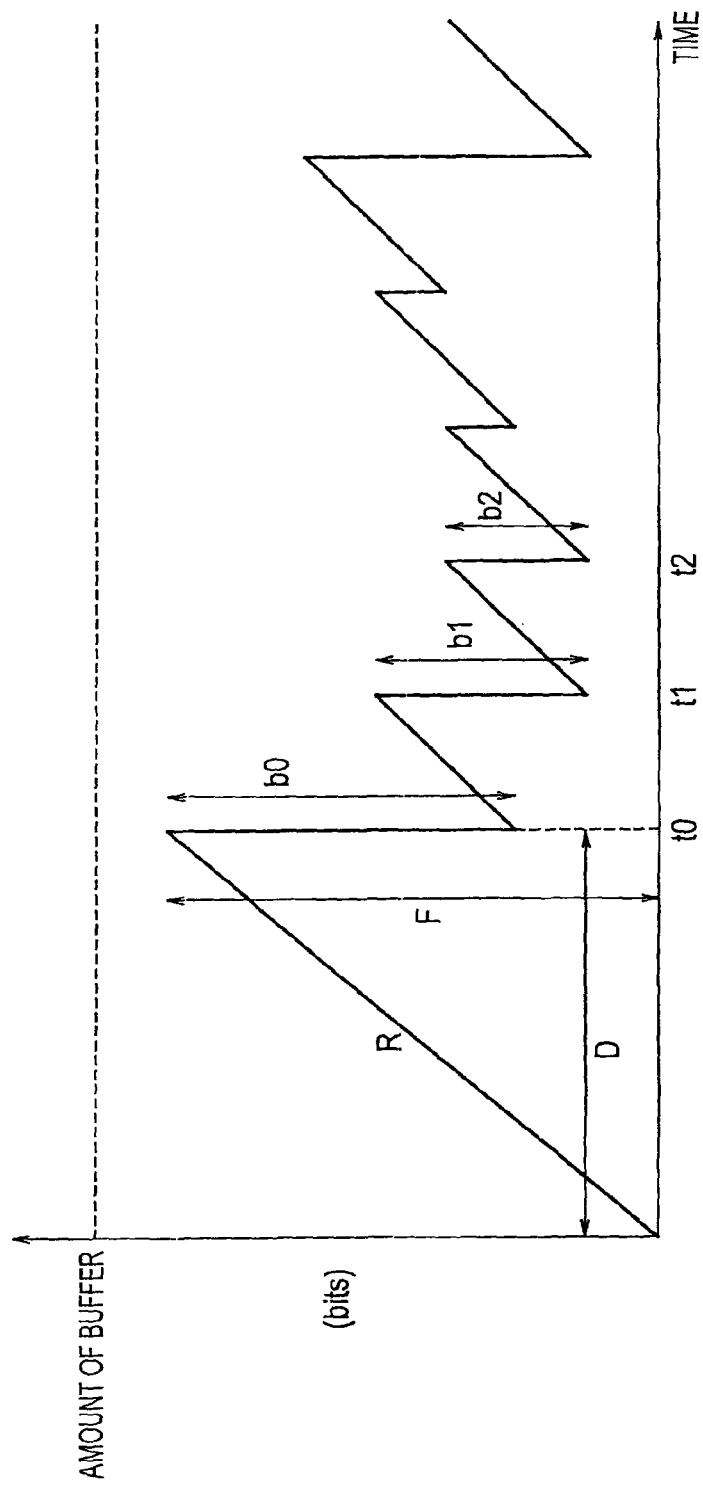
FIG. 3 is a graph for describing the amount of buffer.

The image-information decoding device 40 has essentially the same configuration as the image-information decoding device 40 shown in FIG. 2, and executes similar processing to decode the input bitstream and outputs image information to, for example, a television receiver which is not shown.

Whether or not an entire bitstream is decodable can be determined by checking the characteristic curve of ($R_{min}$, $B_{min}$, $F_{min}$) global, a decoder buffer size, and a decoding bit rate, as described above.

Also, when decoding of only a specific section from a predetermined random access point is desired due to random accessing, the decoding-possibility determining unit 92 similarly creates a characteristic curve as shown in FIG. 4 from ($R_{min}$, $B_{min}$, $F_{min}$). Portions between points are linearly interpolated. In this case, when the decoder buffer and the decoding bit rate are located above the characteristic curve created from ($R_{min}$, $B_{min}$, $F_{min}$), the bitstream is decodable. Thus, in such a case, the decoding-possibility determining unit 92 determines that the bitstream is decodable and supplies the bitstream to the image-information decoding device 40.

Figure 8:
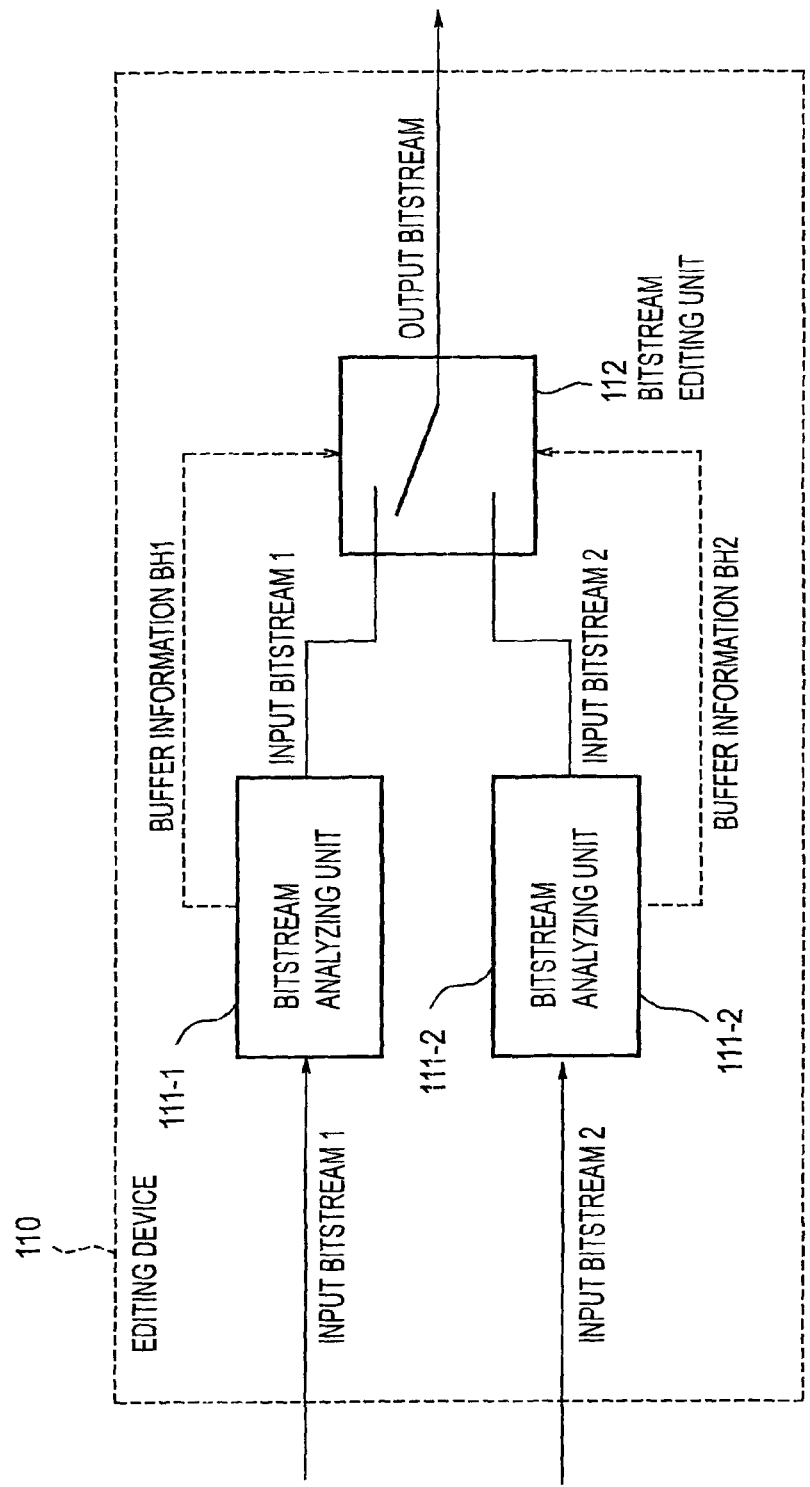
FIG. 8 is a diagram showing the configuration of one embodiment of an editing device according to the present invention.

Next, bitstream editing will be described. FIG. 8 is a diagram showing the configuration of one embodiment of an editing device 110 for editing a bitstream according to the present invention. As an example of editing performed by the editing device 110, a description is given of a case in which splicing is performed to replace a portion of an input bitstream 1 with another input bitstream 2.

Now, splicing will be briefly described. Splicing is to perform editing by replacing a predetermined bitstream with another bitstream at a random access point. Such splicing is performed, for example, when a commercial broadcast is inserted into a television broadcast program. In this case, the input bitstream 1 corresponds to a bitstream of the television broadcast program and the input bitstream 2 corresponds to a bitstream of the commercial.

The input bitstream 1 is input to a bitstream analyzing unit 111-1 and the input bitstream 2 is input to a bitstream analyzing unit 111-2. The bitstream analyzing units 111-1 and 111-2 decode buffer information BH1 and BH2, contained in the input bitstreams 1 and 2, respectively, and output the resulting information to a bitstream editing unit 112.

In accordance with the buffer information BH1 and BH2, the bitstream editing unit 112 determines whether or not the input bitstream 2 can be inserted into the input bitstream 1 at a predetermined editing point. In this case, in order that an edited bitstream is decodable without a buffer failure of the decoder (the decoding device 90), it is necessary to satisfy a condition that the value of amount of buffer occupancy for the random access point and the value of amount of buffer occupancy for a portion immediately before the point are the same.

Decoders using MPEG-2 or -4 were designed so as to operate at a specific bit rate and a buffer size. On the other hand, with regard to decoders using a JVT scheme, restrictions for buffering has been relaxed so that decoding is possible when the characteristic curve is located above the characteristic curve of ($R_{min}$, $B_{min}$, $F_{min}$) even for other bit rates and buffer sizes, as shown in FIG. 4.

In order that bitstream editing does not cause the decoding possibility to be varied before and after the editing, it is sufficient to have the same ($R_{min}$, $B_{min}$, $F_{min}$) for the edit section. Thus, with respect to the input bitstreams 1 and 2, the bitstream editing unit 112 creates the characteristic ($R_{min}$, $B_{min}$, $F_{min}$) for a random access point header located in the edit section, and replaces the section with the bitstream 2 when those values match each other. When the values do not match each other, the bitstream editing unit 112 inserts padding bits to the bitstream 1 or 2 so that the values of ($R_{min}$, $B_{min}$, $F_{min}$) match each other and then replaces a corresponding section with the input bitstream 2.

Restrictions for buffering have been relaxed in the JVT, and the use of this advantage makes it possible to ease the buffer compatibility condition in splicing. In the JVT, when the decoder buffer size and the decoding bit rate are located above ($R_{min}$, $B_{min}$, $F_{min}$), it can be known that the bitstream is decodable. Thus, when ($R_{min}$, $B_{min}$, $F_{min}$) of a predetermined edit section of the input bitstream 2 to be inserted is always located below ($R_{min}$, $B_{min}$, $F_{min}$) of a predetermined edit section of the original input bitstream 1, a decoder that can decode the input bitstream 1 can also perform decoding even with that section being replaced with the bitstream 2.

Figure 9:
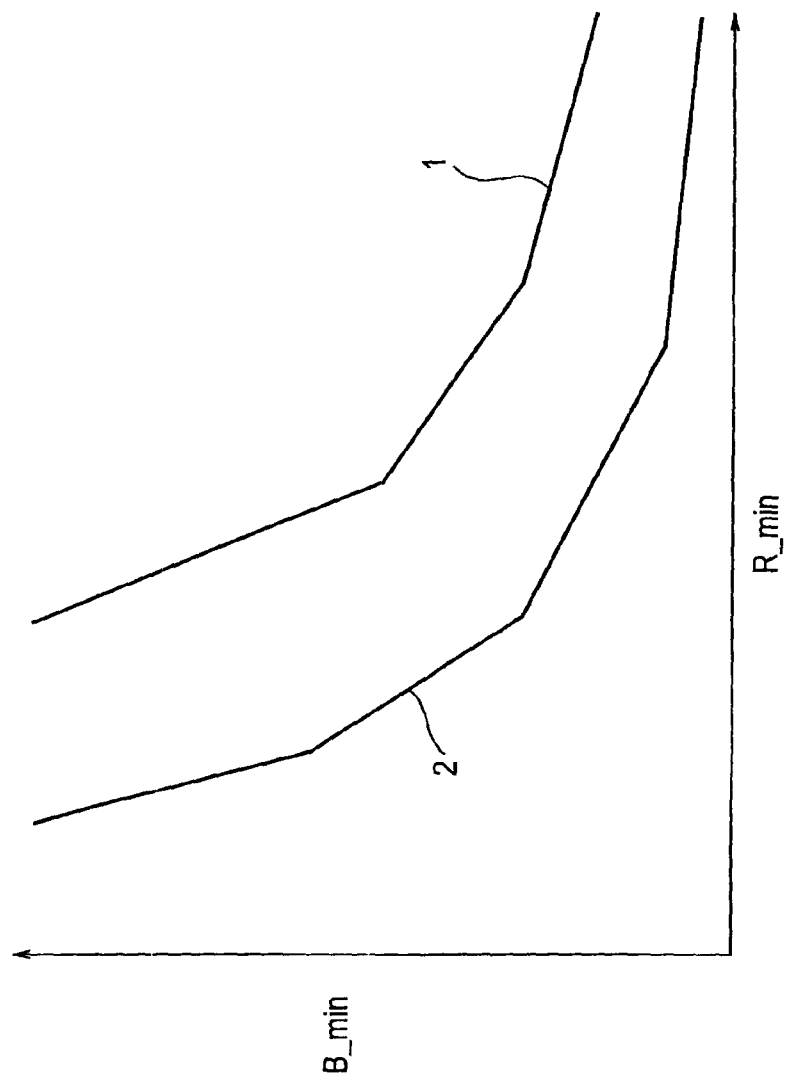
FIG. 9 is a graph for describing the relationship between a bit rate and the amount of buffer.

FIG. 9 illustrates the relationship. Curve 1 represents the characteristic of ($R_{min}$, $B_{min}$, $F_{min}$) of an edit section of the input bitstream 1. Curve 2 represents the characteristic of ($R_{min}$, $B_{min}$, $F_{min}$) of an edit section of the input bitstream 2. When the decoder buffer and the decoding bit rate are located above the curve, the bitstream is decodable. Thus, when curve 2 is always located below curve 1 as shown in FIG. 9, it is guaranteed that decoding is possible.

Accordingly, the bitstream editing unit 112 creates the characteristic of ($R_{min}$, $B_{min}$, $F_{min}$) for a random access point header located in an edit section with respect to the bitstreams 1 and 2. Then, when the characteristic curve of the bitstream 2 is located below the characteristic curve of the bitstream 1, the bitstream editing unit 112 replaces the corresponding section with the bitstream 2.

Conversely, when the characteristics do not match, the bitstream editing unit 112 makes a change by inserting padding bits to the bitstream 1 or 2 so that the characteristic curve of ($R_{min}$, $B_{min}$, $F_{min}$) of the bitstream 2 is located below the characteristic curve of the bitstream 1, and then replaces the section with the input bitstream 2.

When splicing is performed so as to satisfy such condition, a decoder that can decode the bitstream 1 will not fail. After splicing, the bitstream editing unit 112 outputs a final bitstream.

In this manner, containing such information ($R_{min}$, $B_{min}$, $F_{min}$), namely, a minimum bit rate, minimum buffer size, and minimum initial delay time, in the header of a randomly accessible point in a bitstream allows the decoding side to efficiently determine the decoding possibility of the bitstream. Further, this arrangement can facilitate bitstream editing, such as splicing, and can always decode the bitstream without causing buffer failure of a decoding side.

Figure 10:
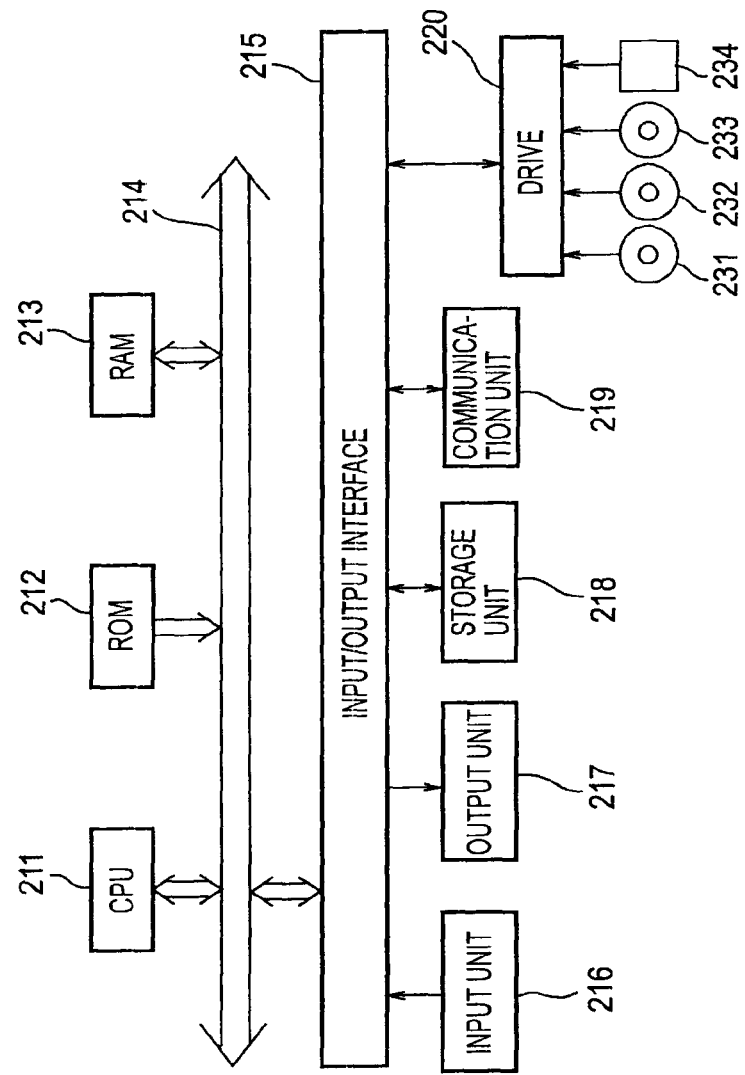
FIG. 10 is a diagram for describing a medium.

FIG. 10 is a diagram showing an example of the internal configuration of a general-purpose personal computer. A CPU (Central Processing Unit) 211 of the personal computer executes various processing in accordance with a program stored in a ROM (Read Only Memory) 212. As appropriate, a RAM (Random Access Memory) 213 stores data and/or a program required for the CPU 211 to execute various processing. An input/output interface 215 is connected to an input unit 216, which is constituted by a keyboard and mouse, and outputs a signal, input through the input unit 216, to the CPU 211. The input/output interface 215 is also connected to an output unit 7, which is constituted by a display, speakers, and so on.

Further, the input/output interface 215 is connected to a storage unit 218, which includes a hard disk and so on, and a communication unit 219, which communicates data with another device through a network such as the Internet.

A drive 220 is used to write/read data to/from a storage medium, such as a magnetic disk 231, an optical disk 232, a magneto-optical disk 233, or a semiconductor memory 234.

As shown in FIG. 10, the storage medium is not only implemented by a package medium distributed separately from a personal computer to supply a program to a user, but is also implemented by a hard disk including the ROM 212 or the storage unit 218 that stores a program and that is supplied to a user after being pre-installed on a computer. An example of the package medium in which a program is recorded is the magnetic disk 231 (including a flexible disk), the optical disk 232 (including CD-ROM (Compact Disc-Read Only Memory), a DVD (Digital Versatile Disc), and the magneto-optical disk 233 (including an MD (Mini-Disc) (registered trademark)), or a semiconductor memory 234.

Herein, steps for writing the program supplied with a medium not only include processing that is time-sequentially performed according to the order described above but also include processing that is not necessarily performed time-sequentially but is executed in parallel or independently.

Herein, the system represents an entire device that is constituted by a plurality of devices.

INDUSTRIAL APPLICABILITY

As described above, according to the encoding device and the method as well as the first program of the present invention, buffer characteristic information about buffering during decoding of a bitstream is contained in a header that is encoded and multiplexed with the bitstream. This can prevent a decoding side from causing buffer failure.

According to the decoding device and the method as well as the second program of the present invention, buffer characteristic information about buffering during decoding, which information contained in a header in an input bitstream, is read and decoding is performed in accordance with the read information. This can prevent buffer failure during the decoding.

Further, according to the editing device and the method as well as the third program of the present invention, a determination as to whether an input bitstream can be edited is made by determining whether a characteristic curve created from information contained in a header in a first bitstream is always located above or is the same as a characteristic curve created from information contained in a header in a second bitstream. This makes it possible to reduce processing required for editing, such as splicing, and to determine whether editing is readily possible.

The invention claimed is:

1. A decoding method, comprising:
acquiring, from a bitstream as bitstream syntax, identification information identifying whether pictures in a randomly accessible predetermined section do not refer to pictures included in another predetermined section in a sequence of the bitstream and buffer characteristic information for the sequence of the bitstream, which is contained within the bitstream and includes at least a first combination of first buffer size information and first bit rate information and a second combination of second buffer size information and second bit rate information in the bitstream as criteria for determining whether the bitstream is decodable, the first and second buffer size information indicating a required buffer size of a buffer that stores the bitstream during decoding of the bitstream and the first and second bit rate information indicating an input bit rate of the buffer;
determining whether the bitstream is decodable by checking bitstream and decoder conformance using a decoder buffer size and a decoding bit rate and bitstream conformance points corresponding to the at least the first combination and the second combination; and
decoding the bitstream using the buffer characteristic information and the identification information and when a result of the determining is that the bitstream is decodable.

2. The decoding method of claim 1, further comprising:
acquiring, from the bitstream, identification information identifying whether pictures in the randomly accessible predetermined section of the bitstream do not refer to pictures included in another section of the bitstream.

3. The decoding method of claim 1, wherein
the first combination of the first buffer size information and the first bit rate information correspond to the randomly accessible predetermined section of the bitstream, and
the second combination of the second buffer size and the second bit rate information correspond to the entire sequence of the bitstream, which includes a plurality of the randomly accessible predetermined sections.

4. The decoding method of claim 1, further comprising:
acquiring the decoder buffer size and the decoder bit rate; and
determining whether the bitstream is decodable based on a comparison between the decoder buffer size and the decoder bit rate and at least a first combination of the buffer size information and the bit rate information included in the buffer characteristics information.

5. The decoding method of claim 1, wherein the bitstream conformance points are points of a characteristic curve defined according to the at least the first combination and the second combination.

6. A decoding device comprising:
circuitry configured to
acquire, from a bitstream as bitstream syntax, identification information identifying whether pictures in a randomly accessible predetermined section do not refer to pictures included in another predetermined section in a sequence of the bitstream and buffer characteristic information for the sequence of the bitstream, which is contained within the bitstream and includes at least a first combination of first buffer size information and first bit rate information and a second combination of second buffer size information and second bit rate information in the bitstream as criteria for determining whether the bitstream is decodable, the first and second buffer size information indicating a required buffer size of a buffer that stores the bitstream during decoding of the bitstream and the first and second bit rate information indicating an input bit rate of the buffer;
determine whether the bitstream is decodable by checking bitstream and decoder conformance using a decoder buffer size and a decoding bit rate and bitstream conformance point corresponding to the at least the first combination and the second combination; and
decode the bitstream using the buffer characteristic information and the identification information when a result of the determining is that the bitstream is decodable.

7. The decoding device of claim 6, wherein the circuitry is further configured to:
acquire, from the bitstream, identification information identifying whether pictures in the randomly accessible predetermined section of the bitstream do not refer to pictures included in another section of the bitstream.

8. The decoding device of claim 6, wherein
the first combination of the first buffer size information and the first bit rate information correspond to the randomly accessible predetermined section, and
the second combination of the second buffer size and the second bit rate information correspond to the entire sequence of the bitstream, which includes a plurality of the randomly accessible predetermined sections.

9. The decoding device of claim 6, wherein the circuitry is further configured to:
acquire the decoder buffer size and the decoder bit rate; and
determine whether the bitstream is decodable based on a comparison between the decoder buffer size and the decoder bit rate and at least a first combination of the buffer size information and the bit rate information included in the buffer characteristics information.

10. The decoding device of claim 6, wherein the bitstream conformance points are points of a characteristic curve defined according to the at least the first combination and the second combination.

11. A decoding device comprising:
circuitry configured to
acquire, from a bitstream as bitstream syntax, buffer characteristic information for the sequence of the bitstream, which is contained within the bitstream and includes at least a first combination of first buffer size information and first bit rate information and a second combination of second buffer size information and second bit rate information in the bitstream as criteria for determining whether the bitstream is decodable, the first and second buffer size information indicating a required buffer size of a buffer that stores the bitstream during decoding of the bitstream and the first and second bit rate information indicating an input bit rate of the buffer;
generating a characteristic curve based on the buffer characteristic information by interpolating portions of the characteristic curve between points derived from the at least the first and second combinations of buffer size information and bit rate information contained within the bitstream;
comparing the decoder buffer size and the decoding bit rate to the characteristic curve to determine whether the bitstream is decodable; and
determining whether to decode the bitstream based on a result of the comparing.

* * * * *